Patented Oct. 10, 1944

2,359,833

UNITED STATES PATENT OFFICE 2,359,833

FIBER-FORMING INTERPOLYMERS

Burt F. Faris, Wilmington, Del., assignor to E. I. du Pont de Nemours & Company, Wilmington, Del., a corporation of Delaware No Drawing. Application October 7, 1941, Serial No. 414,039

15 Claims. (Cl. 260—78)

This invention relates to polymeric materials and more particularly to polyamide compositions of improved dyeing properties.

The polyamides with which this invention is concerned are synthetic, high molecular weight, fiber-forming polyamides of the general type described in United States Patents 2,071,250, 2,071,253 and 2,130,948. These polyamides are usually made by the self-polymerization of a monoamino-monocarboxylic acid or by heating a diamine with a dibasic carboxylic acid until the product has polymerized to the fiber-forming stage, which stage is not generally reached until the polyamide has an intrinsic viscosity as defined in the last mentioned patent of at least 0.4. The polymers obtained from mixtures of diamine and dibasic carboxylic acid, or from various equivalent amide-forming derivatives of these reactants, include a number of polyamides which are particularly valuable as textile fibers because of their high melting points and because filaments of these polyamides can be cold drawn to strong, highly oriented fibers. These fibers, however, are deficient in dyeing properties in that they have a low dye receptivity for dyestuffs of the acid, direct and vat classes, and in that the dyeing accentuates minor non-uniformities in denier and elongation.

This invention has as an object the preparation of polyamides which, in addition to the desirable physical properties mentioned above, possess improved dyeing properties. A further object is the production of new and useful polyamide compositions. A still further object is the manufacture of improved dyed polyamide fibers and fabrics. Other objects will appear hereinafter.

These objects are accomplished by interpolymerizing in certain proportions two different polyamide-forming compositions one of which comprises essentially hexamethylenediamine and adipic acid in substantially equimolecular proportions, and the other of which comprises essentially a linear polyamide-forming composition comprising a bifunctional amide-forming reactant containing a secondary amino group.

I have discovered that when this mixture of polyamide-forming reactants are interpolymerized in the proportion by weight, based on the total weight of the named ingredients, of from 5% to 15% of the above mentioned polyamide-forming composition containing a bifunctional amide-forming reactant having a secondary amino group, that the resulting interpolymer can be formed into strong oriented fibers which are markedly improved in dye receptivity and in uniformity of the dyeing and which have high melting points, namely, above 220° C.

This polyamide-forming composition, which is interpolymerized with that yielding polyhexamethylene adipamide, can be either of the amino acid type, for example N-methyl-omega-aminoheptanoic acid $CH_3NH.(CH_2)_6COOH$, or of the diamine-dibasic acid type, for example a mixture in substantially equimolecular proportions of a dibasic carboxylic acid and a disecondary diamine, that is a diamine in which each of the two functional amide-forming amino nitrogens bear only one hydrogen atom. An especially useful diamine of this kind is piperazine. The diamine-dibasic acid constituents of the polyamide-forming compositions can be used as such but for convenience are used in the form of the diamine-dibasic acid salts. Thus from 95% to 85% of the salt of hexamethylene diamine and adipic acid, namely, hexamethylenediammonium adipate, is reacted with from 5% to 15% of the piperazinium adipate.

The present interpolymers are prepared by known methods. In the usual practice substantially chemical equivalent amounts of hexamethylenediamine and adipic acid, or amide-forming derivatives thereof, are heated at temperatures of from 180°–300° C., and preferably from 200°–290° C., with the polyamide-forming composition consisting of one or both of a self-polymerizable amino acid containing a secondary amino group, or an equimolecular mixture of dibasic carboxylic acid and a disecondary diamine, the heating being continued until a fiber-forming polymer is formed. The reaction is conducted in the presence or absence of solvent or catalyst, and preferably in the absence of air. The reaction is carried out under conditions permitting the removal of water or other by-product, at least during the last stages of the reaction. In the case of the diamine-dibasic acid reactants, the initial reaction on intimate contact is the formation of the diamine-dibasic acid salt. As previously indicated, it is desirable to isolate the salts prior to their mixing and conversion to the interpolyamide since the salts are easily purified and contain the diamine and dibasic acid reactants in substantial equivalency. It is often desirable in preparing the salts to add a 1% to 10% excess of diamine in order that the resulting salt will have perfect balance. Furthermore, during the recrystallization of these salts the addition of a small amount of the free diamine (ca. 2% to 3%) helps maintain this perfect balance.

This is particularly true in the preparation of piperazinium adipate.

When the interpolymers of this invention are prepared with an amino acid component containing a secondary amino group, hydrolysis with hydrochloric acid converts the interpolymer into components comprising adipic acid, hexamethylenediamine hydrochloride, and the hydrochloride of the amino acid. If a mixture of dibasic carboxylic acid and a disecondary diamine is used in place of or with the mentioned amino acid, the hydrolysis components comprise adipic acid, hexamethylenediamine hydrochloride, and the hydrochloride of the secondary diamine. Additional hydrolysis products may be formed depending on the number and nature of other reactants used in the preparation of the interpolymer.

The invention is further illustrated by the following examples in which the parts are by weight.

Example I

Piperazinium adipate is prepared by dissolving 390 parts of anhydrous, freshly distilled piperazine in 1200 parts of water and adding this solution to 630 parts of adipic acid dissolved in 1200 parts of hot 95% ethanol. The piperazinium adipate begins to precipitate immediately but the reaction mixture is chilled to 5° C. before filtering. The crystalline salt is then dissolved in the minimum quantity of hot water (approximately 6000 parts at 90°–95° C.), decolorized with activated carbon, and filtered hot. Ten parts of anhydrous piperazine dissolved in water is added to the hot filtrate, which is then diluted with an equal volume of 95% ethanol. Piperazinium adipate soon begins to crystallize, but the material is chilled to 5° C. before filtering. The salt melts at 222–225° C.

An interpolyamide is prepared from a mixture of 900 parts of hexamethylenediammonium adipate, 100 parts of piperazinium adipate, and 1 mol % of piperazine as a viscosity stabilizer in 300 parts of water by heating under an atmosphere of nitrogen until an internal pressure of 250 lbs. per sq. in. is reached. Steam is then bled from the autoclave at such a rate as to maintain a pressure of 250 lbs. while increasing the autoclave temperature to 265° C. After all the steam has been removed, the heating is continued for an hour under atmospheric pressure and an additional hour under reduced pressure at 275° C. The resulting interpolymer having a viscosity of 770 poises in the molten condition at 285° C., is spun from melt at 3000 ft. per minute into 148 denier-13 filament yarn which is then cold drawn to 3.93 times its original length. The yarn melts at 234° C.

Example II

An interpolyamide having a viscosity of 1550 poises at 285° C. is prepared in a manner analogous to that described in Example I using 950 parts of hexamethylenediammonium adipate and 50 parts of piperazinium adipate. The interpolymer is spun at 3000 ft./min. into 148 denier-13 filament yarn which is drawn to 3.93 times its original length. The yarn melts at 242° C.

Yarns from the interpolymers obtained from the above examples when dyed with neutral dyeing acid colors in a manner analogous to the dyeing of silk, and when dyed with vat and direct colors in a manner analogous to the dyeing of cotton or rayon, show markedly improved dye receptivities as compared to fibers prepared from the usually used polyamides of either the amino acid type or the diamine-dibasic acid type. Thus the yarn obtained from the polymer of Example I when dyed with acid colors, e. g. dyes having colour index numbers 114 and 430, of 2% concentration in the dye bath showed a dye receptivity of 95% (i. e., a one gram sample of the yarn absorbed 95% of the dye from 40 cc. of dye solution) as compared to only 25% for yarn made from polyhexamethylene adipamide, and to 75% for silk. At the same concentration with a direct color dye, e. g., one of colour index number 518, the interpolymer had a dye receptivity of 90% as compared to 10% for polyhexamethylene adipamide and 90% for rayon. In the case of vat colors, e. g. those having colour index numbers of 1113 and Pr. 124, in 5% concentration the interpolymer had a dye receptivity of 92% as compared to 40% for polyhexamethylene adipamide. Although slightly inferior to the product of Example I, the yarn obtained from the interpolymer of Example II, when similarly dyed, also showed a large increase in dye receptivity over that obtained with the polyhexamethylene adipamide fiber.

An even more valuable characteristic of fibers made from the interpolymers of this invention, which enhances their utility in the manufacture of improved dyed polyamide fibers, is their better level-dyeing properties. For example, the non-uniformities in denier and in elongation, which are to some extent unavoidable in processing polyamide fibers, cause readily discernible differences in color intensity at the mentioned non-uniformities when the fibers are dyed with many of the usual dyes. This difficulty, on the other hand, is practically negligible in the case of the dyed fibers of this invention. The superior level-dyeing properties of the present fibers is clearly shown by test in which the comparisons are made with yarns in which the threads have been broken and tied to yarn in which the filaments have been drawn to different elongation and denier. Polyhexamethylene adipamide yarn, in which the two differently drawn filaments forming the threads differ in draw ratio by 4.3%, showed a number 3 or 4 color junction at the union of the differently oriented threads when the yarn is dyed with an acid color, e. g., dye of colour index number 430. Similar yarn of the polymers of this invention when dyed with the same dye show but a fraction of the color junction value of the polyhexamethylene adipamide fibers, yarn of the polymer of Example I showing a zero color junction and that of Example II a 1 color junction. A number 1 color junction is defined as the lowest perceptible difference in color intensity discernible by eye. Like improvement is obtained in the case of other colors. Acetate dye of prototype No. 43, A. A. T. C. C. Year Book 1940, page 489, for example, shows a number 1 color junction with the mentioned polyhexamethylene adipamide yarn as compared to zero color junction for the yarn from the polymer of Example I. For vat color of colour index 1113 polyhexamethylene adipamide yarns show a number 3 to 4 color junction and yarns from the polymer of Example I a number 1 color junction.

Example III

N-methyl-omega-aminoheptanoic acid is prepared by reacting omega-chloroheptanoic acid (10 parts) with methylamine (55 parts) in a sealed reactor for 24 hours at 50° C. The reaction vessel is chilled, opened, and the methylamine allowed to evaporate. The reaction mixture is then heated on the steam bath to expel the last traces of methylamine. A slight amount of sodium hydroxide (4 parts) dissolved in water is added and the heating continued. Finally an excess of dilute hydrochloric acid is added and the reaction mixture dried in vacuum over sodium hydroxide. The dried reaction mass is extracted with absolute ethanol in which the amino acid hydrochloride is soluble. The solution is shaken with an excess of silver oxide, filtered, and the solution concentrated. N-methyl-omega-aminoheptanoic acid crystallizes from solution.

An interpolyamide is prepared from 90 parts of hexamethylenediammonium adipate intimately mixed with 10 parts of recrystallized N-methyl-omega-aminoheptanoic acid (M. P. 122.5° to 125° C.) by heating the reactants in a sealed reactor for two hours under an atmosphere of nitrogen at 220° C., then heating for one hour at 285° C. under nitrogen at atmospheric pressure, and finally for one hour under reduced pressure. The polymer melts at 226° C.

*Example IV*

An interpolyamide is prepared in a manner identical to that described above from 90 parts hexamethylenediammonium adipate and 10 parts of N,N'-dimethylhexamethylenediammonium adipate. This interpolymer melts at 237° C.

*Example V*

An interpolyamide melting at 235° C. is prepared from 90 parts of hexamethylenediammonium adipate and 10 parts of N,N'-dimethyltriglycoldiammonium adipate (salt from

and adipic acid) under the same cycle used for the preparation of the polymers of the two preceding examples.

The dye receptivities of the polymers of the three foregoing examples are obtained by the following procedure: Small slices of the interpolymers are pressed into transparent films of 260° C. under 5000 lbs. pressure in a Carver press. Strips of the film are cut and cold drawn to their breaking point (approximately 4 times their original length) and these oriented films are dyed with acid, direct, and vat colors, and their receptivity determined by exhausting the residual color in the dye bath on either rayon or silk skeins for comparison with a set of standards. The dye receptivities, that is, the percent color removed from the dye bath (using 40 cc. of dye solution per gram of film), of these polymers, depending upon the particular dye and polymer, is from 90% to 95%. Similar film of polyhexamethylene adipamide film likewise dyed showed only 10% color removed from the bath in the case of the direct color, 25% with acid color, and 40% with vat color. The dye receptivity of the present polymers is equal to, and in some instances superior to that of silk, which shows a dye receptivity of 75% with acid color, and to that of rayon which shows a dye receptivity of 90% with direct color and 95% with vat color. The receptivity of the present polymers for dyestuffs of the cellulose acetate class is higher than that of silk.

Diamines containing a secondary amino group other than those previously mentioned which are useful in the practice of this invention include such compounds as N,N'-dimethylethylenediamine, N,N'-dimethyltrimethylenediamine, N,N'-diethyltetramethylenediamine, N,N'-dimethylpentamethylenediamine, N,N'-dimethyldiglycoldiamine, N-methylhexamethylenediamine, N,N'-dimethyldecamethylenediamine, and N,N'-dimethyl-paraxylylenediamine.

The dibasic carboxylic acids which are reacted with diamines of the above type can be any of the compounds known to yield with diamines generally fiber-forming polyamides of the kind described in the previously mentioned patents. Acids of this kind are glutaric acid, adipic acid, pimelic acid, suberic acid, azelaic acid, sebacic acid, and p-phenylenediacetic acid.

Suitable N-substituted amino acids are illustrated by N-methyl-omega-heptanoic acid, N-methyl-epsilon-aminocaproic acid, and N-methyl-omega-aminononanoic acid.

The amide-forming derivatives which can be used in place of the amino acids, dibasic carboxylic acids and diamines mentioned herein include a number of available compounds. Amide-forming derivatives of the amino acids include the ester, anhydride, amide, lactam, acid halide, N-formyl derivative, carbamate, and, in the presence of water, the nitrile. Amide-forming derivatives of the dibasic carboxylic acids comprise the mono- and di-ester, the anhydride, the mono- and di-amide, the acid halide, and the following compounds in the presence of water: Nitrile, cyanocarboxylic acid, cyanoamide, and cyclic imide. Amide-forming derivatives of the diamines include the carbamate, N-formyl derivative and the N,N'-diformyl derivative.

It is important that the amount of polyamide-forming composition containing a secondary amino group which is used with the hexamethylenediammonium adipate in the preparation of the interpolymers of this invention be kept between 5 and 15% of the total weight of the polymer-forming reactants. If less than 5% is used, the desired increase in dye receptivity and level dyeing properties is not achieved. On the other hand, if more than 15% is used, there is an objectionable sacrifice in melting point.

It will be apparent from the foregoing examples and the data given in connection therewith that I have developed a polyamide which melts sufficiently high for textile fibers, which are as strong as the polyamide fibers previously used, but which in addition possess improved dyeing properties due to their enhanced dye receptivity and superior level dyeing properties. The polyamides of this invention are of primary interest in the preparation of yarns and fabrics. However, they can also be used in other applications to which synthetic linear polyamides have been put, e. g., bristles, films, and coating, adhesive and molding compositions. They are of particular value in uses where high dye receptivity is desired.

The polyamides of this invention can be used in conjunction with other polyamides and/or in conjunction with resins, cellulosic materials, pigments, delusterants, plasticizers, antioxidants, and other modifying agents.

As many apparently widely different embodiments of this invention may be made without departing from the spirit and scope thereof, it is to be understood that I do not limit myself to the specific embodiments thereof except as defined in the appended claims.

I claim:

1. A fiber-forming polymer which comprises essentially the interpolymerization product of substantially equimolecular proportions of hexamethylenediamine and adipic acid, and from 5% to 15% by weight of the total reactants forming said polymer of a polyamide-forming composition comprising a bifunctional amide-forming reactant containing a secondary amino group, said polyamide-forming composition consisting essentially of reacting material selected from the class consisting of (a) monoaminomonocarboxylic acids, and (b) mixtures of diamine and dibasic carboxylic acid in substantially equimolecular proportions.

2. A fiber-forming polymer which comprises essentially the interpolymerization product of substantially equimolecular proportions of hexamethylenediamine and adipic acid, and from 5% to 15% by weight of the total reactants forming said polymer of a monoaminomonocarboxylic acid containing a secondary amino group.

3. A fiber-forming polymer which comprises essentially the interpolymerization product of substantially equimolecular proportions of hexamethylenediamine and adipic acid, and from 5% to 15% by weight of the total reactants forming said polymer of an omega-N-methyl monoaminomonocarboxylic acid.

4. A fiber-forming polymer which comprises the interpolymerization product of reactants comprising essentially substantially equimolecular proportions of hexamethylenediamine and adipic acid, and substantially equimolecular proportions, in amount of from 5% to 15% by weight of the total reactants forming said polymer, of a dibasic carboxylic acid and a disecondary diamine.

5. A fiber-forming polymer which comprises the interpolymerization product of reactants comprising essentially substantially equimolecular proportions of hexamethylenediamine and adipic acid, and substantially equimolecular proportions, in amount of from 5% to 15% by weight of the total reactants forming said polymer, of a dibasic carboxylic acid and piperazine.

6. A fiber-forming polymer which comprises the interpolymerization product of reactants comprising essentially substantially equimolecular proportions of hexamethylenediamine and adipic acid, and substantially equimolecular proportions, in amount of from 5% to 15% by weight of the total reactants forming said polymer, of adipic acid and piperazine.

7. A fiber-forming polymer which comprises the interpolymerization product of reactants comprising essentially substantially equimolecular proportions of hexamethylenediamine and adipic acid, and substantially equimolecular proportions, in amount of from 5% to 15% by weight of the total reactants forming said polymer, of adipic acid and N,N'-dimethyltriglycoldiamine.

8. A dyed fiber composed of the interpolyamide defined in claim 1.

9. A dyed textile fabric composed of the interpolyamide defined in claim 1.

10. A dyed textile fiber composed of the interpolyamide defined in claim 6.

11. A process for making fiber-forming polymers of improved dyeing properties which comprises interpolymerizing substantially equimolecular proportions of hexamethylenediamine and adipic acid with from 5% to 15% by weight of the total reactants forming said polymer of a polyamide-forming composition comprising a bifunctional amide-forming reactant containing a secondary amino group, said polyamide-forming composition consisting essentially of reacting material selected from the class consisting of (a) monoaminomonocarboxylic acids, and (b) mixtures of diamine and dibasic carboxylic acid in substantially equimolecular proportions.

12. The process set forth in claim 11 in which said bifunctional amide-forming reactant is a monoaminomonocarboxylic acid containing a secondary amino group.

13. A process for making fiber-forming polymers of improved dyeing properties which comprises interpolymerizing reactants comprising essentially equimolecular proportions of hexamethylenediamine and adipic acid, and substantially equimolecular proportions, in amount of from 5% to 15% by weight of the total reactants forming said polymer, of a dibasic carboxylic acid and a disecondary diamine.

14. A process which comprises polymerizing a mixture of two diamine-dibasic acid salts one of which is hexamethylenediammonium adipate and the other of which is the salt of a dibasic carboxylic acid and a disecondary diamine, said last mentioned salt being from 5% to 15% by weight of the two salts.

15. A process which comprises polymerizing a mixture of diamine-dibasic acid salts one of which is hexamethylenediammonium adipate and the other of which is piperazinium adipate, said last mentioned salt being from 5% to 15% by weight of the two salts.

BURT F. FARIS.